US007848734B2

(12) United States Patent
Engelhart

(10) Patent No.: US 7,848,734 B2
(45) Date of Patent: Dec. 7, 2010

(54) PREPAID TELECOMMUNICATION SYSTEM

(75) Inventor: Robert L. Engelhart, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 10/295,233

(22) Filed: Nov. 14, 2002

(65) Prior Publication Data

US 2004/0098310 A1 May 20, 2004

(51) Int. Cl.
*H04M 11/00* (2006.01)
(52) U.S. Cl. ............... 455/406; 455/405; 455/407; 455/408; 455/409; 379/114.2; 379/114.01; 379/111
(58) Field of Classification Search .......... 455/405–409, 455/410–411, 414.1, 435.1, 451–452.2, 426.1, 455/550.1, 566; 379/114.2, 111, 114.01; 705/80, 77, 52
See application file for complete search history.

(56) References Cited

U.S. PATENT DOCUMENTS

| 5,684,861 | A | 11/1997 | Lewis et al. |
| 5,724,659 | A | 3/1998 | Daniel et al. |
| 6,026,292 | A | 2/2000 | Coppinger et al. |
| 6,070,067 | A * | 5/2000 | Nguyen et al. ............... 455/407 |
| 6,285,749 | B1 * | 9/2001 | Manto ........................ 379/111 |
| 6,430,406 | B1 * | 8/2002 | Frisk ........................... 455/406 |
| 6,453,158 | B2 | 9/2002 | Donovan et al. |
| 6,704,563 | B1 * | 3/2004 | Senn et al. ................... 455/406 |
| 6,829,339 | B1 * | 12/2004 | Kunugi et al. ............... 455/405 |
| 7,065,339 | B2 * | 6/2006 | Vallinen et al. ............. 455/406 |
| 7,095,838 | B1 * | 8/2006 | Kanerva et al. ......... 379/211.02 |
| 2003/0125011 | A1 * | 7/2003 | Campbell .................... 455/406 |
| 2003/0235184 | A1 * | 12/2003 | Dorenbosch et al. ........ 370/352 |

OTHER PUBLICATIONS

Merriam Webster's Collegiate Dictionary, 10th edition, (c) 1997, p. 395, "escrow".*

* cited by examiner

*Primary Examiner*—Patrick N Edouard
*Assistant Examiner*—Justin Y Lee
(74) *Attorney, Agent, or Firm*—Zagorin O'Brien Graham LLP

(57) ABSTRACT

A device communicates with a telecom system to establish a call or data session. The communication includes an identifier used by the telecom system to obtain account information and/or preauthorization from a fund guardian. The fund guardian maintains account information about the device and/or subscriber associated with the identifier. A fund guardian authorizes a call access cost or data session access cost. The telecom system facilitates the call or data session between the device and a destination address until the authorized access costs are expired. A reauthorization can occur prior to expiration. An access rate negotiation may also include a bandwidth negotiation.

18 Claims, 5 Drawing Sheets

```
item                    TRANSACTION
cost                    INFORMATION
transaction date
download size
transaction id
vendor authentication credentials
vendor fund confirmation address
vendor payment address
```

```
transaction id          PAYMENT
cost                    AUTHORIZATION
client authentication credentials
authorization code
vendor fund confirmation address
vendor payment address
```

```
fund guardian authentication credentials
transaction id
authorization code      PAYMENT
                        CONFIRMATION
```

PREPAID TELECOMMUNICATION SYSTEM

FIELD

The invention relates to communication networks, and more particularly to communication devices and networks providing per call or per session access authorization.

BACKGROUND

Increasingly, communication is accomplished via wireless technologies. Mobile devices such as cell phones, laptop computers, game players, music players, and personal digital assistants may be used to communicate voice and non-voice information using wireless signals over wireless networks. A wireless network is any telecommunication system wherein wireless signals are communicated to and from wireless devices that utilize the system. A telecommunication system is a collection of equipment (for example, electrical and optical switching equipment, computing resources, etc.) to enable people and/or devices to communicate with one another over substantial distances.

The user of a wireless device may pre-pay (e.g., pay in advance of access) for use of the telecommunication system. With prepayment, the telecommunication system provider may be certain of payment for use of its facilities. The prepaying customer may be assured that charges for using the telecommunication system will not exceed the pre-paid amount, unless additional payment is first authorized.

Conventional prepaid telecommunications systems accept prepayment in the form of funds transferred from the customer to the telecom system provider. The prepayment is typically a separate transaction from the calls the customer makes and receives.

A drawback to conventional prepayment approaches is that the customer must typically part with substantial funds in order to enable pre-paid access. The funds that the customer must part with typically comprise the cost of using the telecommunication system for an extended period of time. The customer may not actually use all of the time paid for, or may take many days, weeks, or months to use all the time. For example, in a typical prepaid system, the customer may be required to prepay for one hundred, five hundred, or a thousand minutes of use. Such large pre-allocations of funds may tax the financial resources of less affluent customers.

Another drawback of conventional prepayment approaches is that the customer may not be presented with an opportunity to approve or disapprove the rate charged against the prepaid amount on a transaction-by-transaction basis. If the customer is roaming on a telecom network other than the one to which they subscribe, the rates charged to send or receive a call may be substantially higher than the rates charged on the customer's home network. Further, a subscriber is typically locked into using a specific service provider, when using conventional prepaid services.

For these and other reasons, it may benefit the customer to have the ability to prepay for use of the telecom system on a transaction basis.

SUMMARY

A device communicates with a telecom system to establish a call or data session. The communication includes an identifier used by the telecom system to obtain account information and/or preauthorization from a funds guardian. The funds guardian maintains account information about the device and/or subscriber associated with the identifier.

A fund guardian authorizes a call access cost or a data session access cost. The telecom system facilitates the call or data session between the device and a destination address until the authorized access costs are expired. A reauthorization can occur prior to expiration. An access rate negotiation may also include a bandwidth negotiation and/or a specific supplementary service feature request.

In one respect, a subscriber is free to choose a service provider independent of a prepaid account. In such a case, the prepaid system is decoupled from a prepaid account.

Additional features and advantages will be made apparent from the following detailed description of the illustrated embodiment that proceeds with reference to the accompanying drawings.

BRIEF DESCRIPTION OF THE DRAWINGS

FIG. 5 illustrates an embodiment of a transaction record.

FIG. 6 illustrates an embodiment of a payment authorization record.

FIG. 7 illustrates an embodiment of a payment confirmation record.

DESCRIPTION

References to 'a' or 'an' embodiment do not necessarily refer to the same embodiment, although they may. Like references in the figures refer to like elements. Lines of communication between two points (for example in FIGS. 2 and 3) do not necessarily indicate direct communication between the points, although they may. Communication identified by a single arrow may comprise information communicated together or in separate messages and/or signals.

Figure 1:
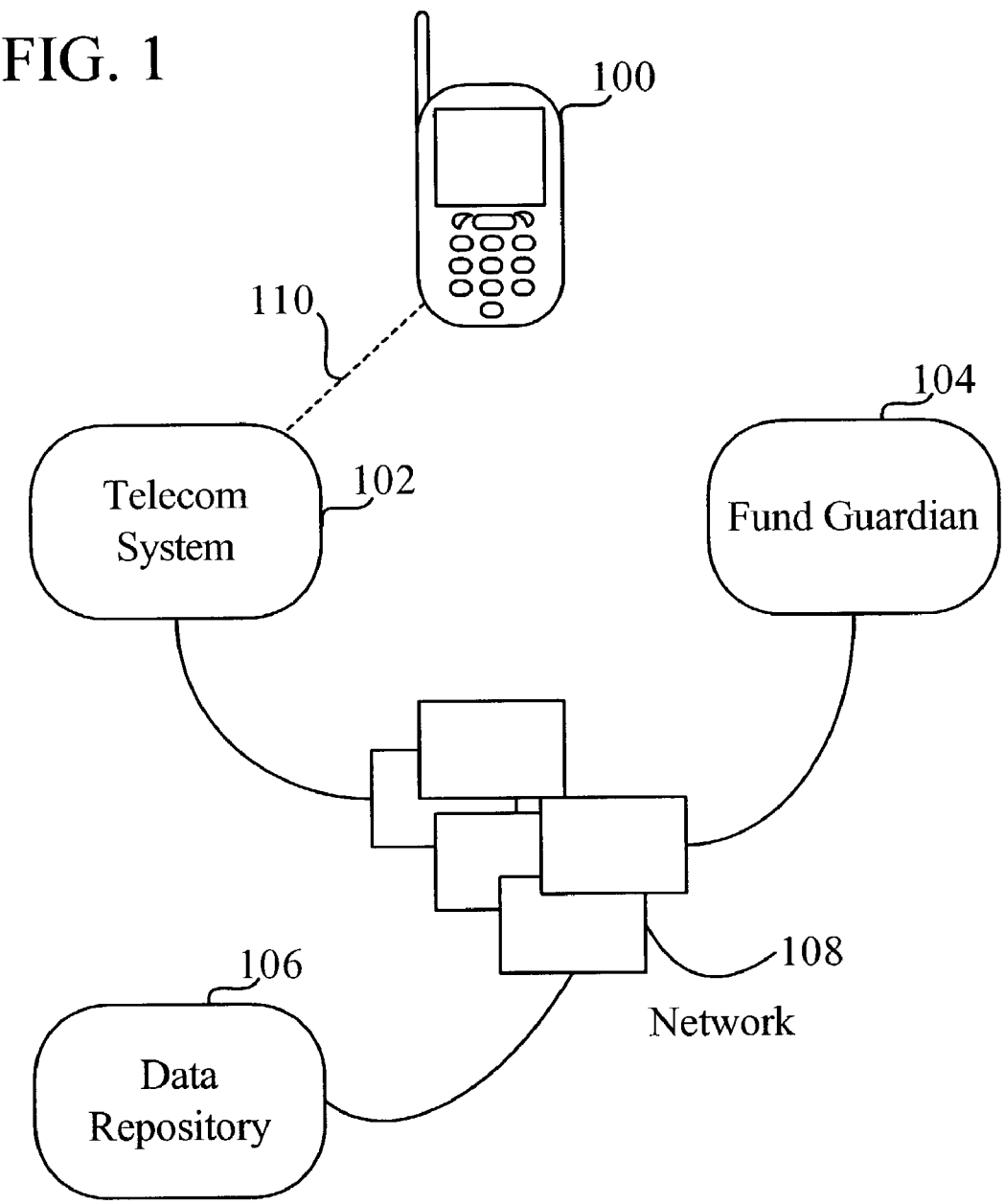
FIG. 1 is a block diagram of an embodiment of a prepaid wireless telecom network.

With reference to FIG. 1, a device 100 communicates via an embodiment of a telecom system 102. The device 100 depicted is a mobile device, although so-called "tethered" devices (devices with a fixed location) may also be employed. The mobile device 100 may be a mobile telephone (e.g. a "cell" or other wireless phone), an automobile computer system, a personal computer, a handheld computer, a personal digital assistant, or other device. Herein, a computer or computer system is any device or collection of devices comprising at least one processor and memory, the memory to store instructions and data for execution and/or manipulation by the processor. Exemplary computers and computer systems are personal computers, server computers, handheld and palm-type computers, gaming and/or music playing devices, data centers, and web sites.

The device 100 communicates with the telecom system 102, and in one embodiment, the device 100 is a mobile phone that communicates with a Mobile Switching Center (MSC) or a Serving GPRS Support Node (SGSN) in the telecom system 102. The device signals 110 the telecom system via a wireless, fiber, or copper connection. The telecom system 102 is coupled to a data repository 106 and a fund guardian 104 via a network 108. The network 108 may comprise a collection of data processing and signal routing devices. These devices may be coupled wirelessly and/or by way of copper and/or optical conductors. The network 108 may comprise computer systems and/or switching and/or routing systems. The Internet, working in conjunction with private wireless access providers, is one example of a network. Details of the network are omitted so as not to obscure the description of the present invention.

The data repository 106 is any device to store information. The data repository 106 may comprise magnetic, optical, or other information storage technology. In one embodiment, the data repository 106 may comprise a hard disk, removable disk, optical disk, or magnetic tape of a computer system. In a representative embodiment, the data repository 106 is a storage device referred to as a Home Location Registry (HLR) of a telecom system to which a customer subscribes. In some embodiments, the data repository 106 (and possibly even the fund guardian 104) may be considered "part of" the telecom system 102. For example, in one embodiment, the telecom system 102 may be the customer's subscription system, and the data repository 106 may be part of the system's HLR. Likewise, embodiments may exist in which the provider of the telecom system owns or otherwise maintains control of the customer's funds. In such embodiments the fund guardian 104 may be a part of the telecom system 102.

The fund guardian 104 is any system that provides or maintains access to the customer's funds such as, for example, a credit or debit card system, an escrow system, a banking system, a system comprising electronic wallet software, and so on. The network 108 may comprise a 'financial gateway' through which the fund guardian is accessed. Examples of financial gateways are VisaNet and Western Union. With the customer's authorization, the fund guardian 104 may be employed to debit and/or allocate the customer's funds for use of the telecom system 102.

Figure 2:
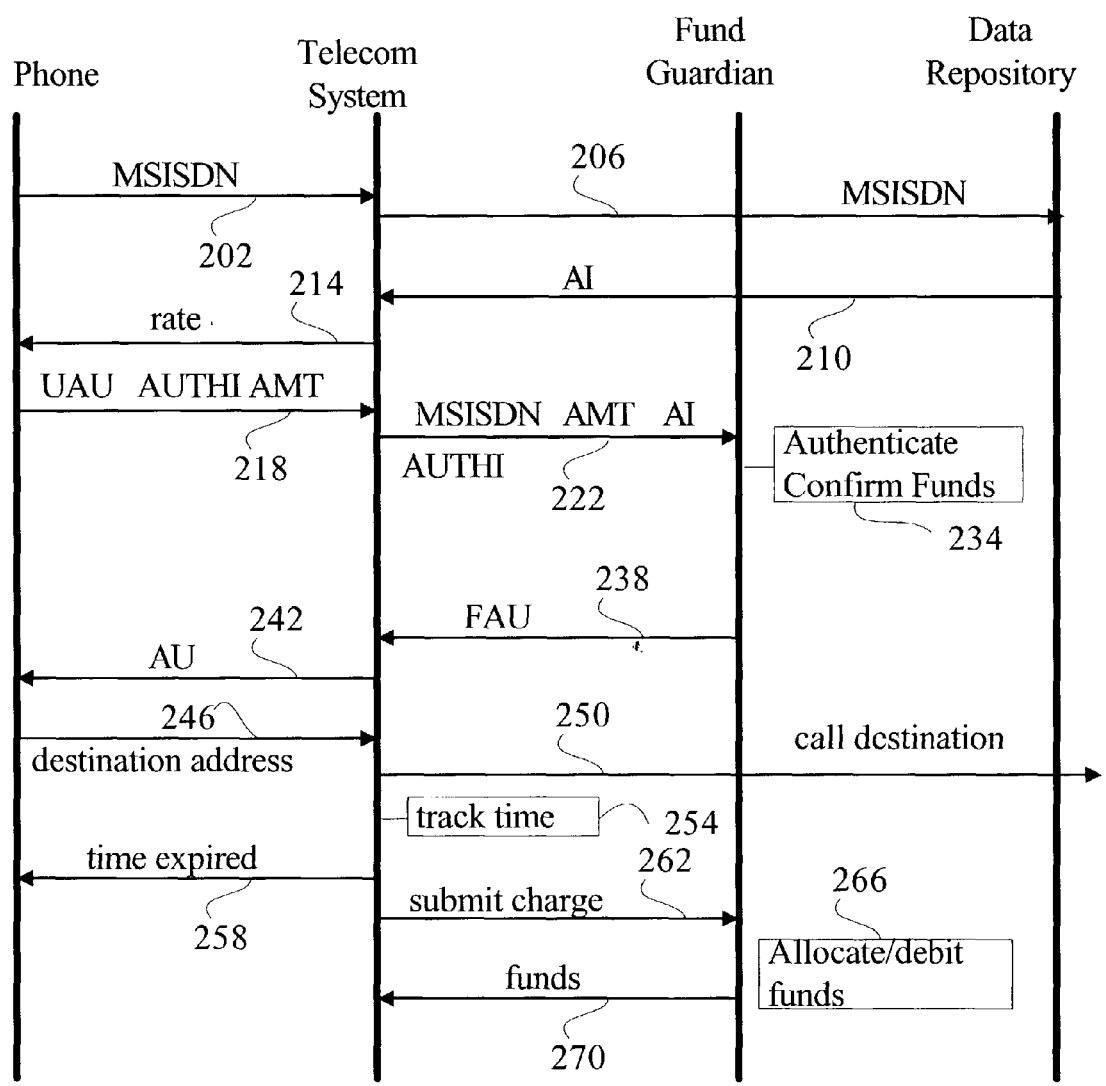
FIG. 2 illustrates a prepaid scenario in an embodiment of a telecom network.
Figure 3:
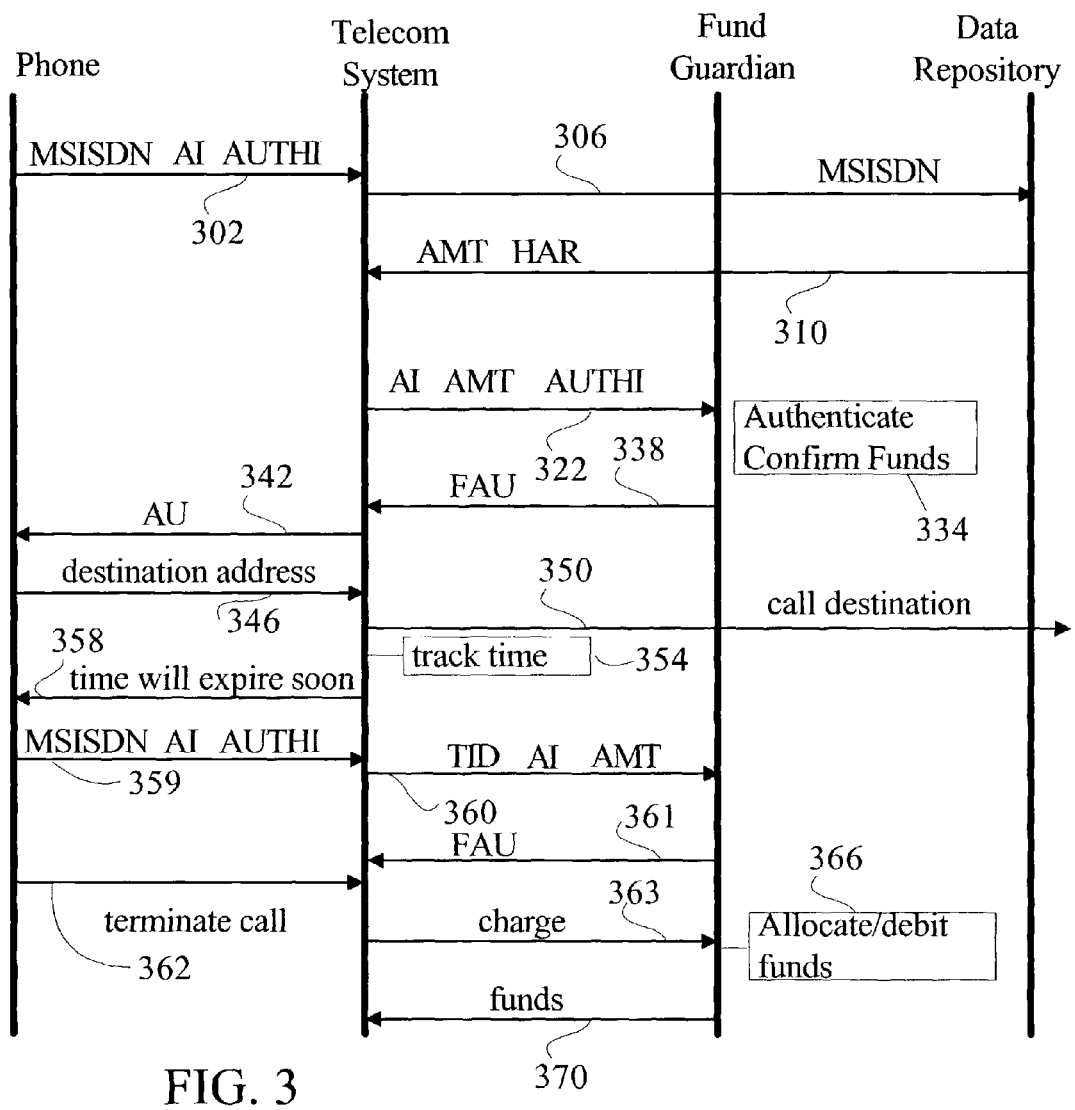
FIG. 3 illustrates a prepaid scenario in an embodiment of a telecom network.

FIGS. 2 and 3 illustrate embodiments of a system to help reduce the financial inconvenience of large prepaid allocations, and to empower the customer with more control over prepaid charges and/or network selection. Although the embodiments described employ a mobile phone, the methodologies are equally applicable to other devices.

With reference to FIG. 2, the customer's device (e.g., a phone) may access a telecom system. At 202 the phone communicates an identifier to the telecom system. In one embodiment, the identifier is a Mobile Station Identifier (e.g., a MSISDN in GSM or GPRS networks, or an MSID in TDMA networks), International Mobile Subscriber Identifier (IMSI), or International Mobile Equipment Identity (IMEI). Other device identifiers, customer identifiers, or subscriber identity module (SIM) identifiers may also be used.

At 206 the identifier is supplied to a data repository 106 (DR). In one embodiment, the data repository is identifiable in the device (e.g., SIM) and transmitted upon registration. Another embodiment would allow a subscriber to specify a DR from an application resident in a handset or as specified in the SIM. This allows the subscriber some degree of choice and flexibility to use one or more data repositories. This may be important if credit card or other billing information is included in the DR data. The DR may be a separate data repository in addition to a home location register. In one embodiment a DR may not be needed if encryption, authentication and authorization is not be necessary. For example, when this type of information is stored in a home location register along with other feature information. If a DR is not needed then the subscriber simply provides a fund guardian address to allow the service provider to charge for service. In such a case, either features or encryption, authentication and authorization information could be defaulted or ignored.

Another embodiment would include a DR with encryption, authentication and authorization information, but the fund guardian, credit card, or eWallet information would be provided by the subscriber or the application on the subscriber's handset. In one embodiment, the fund guardian can hold credit card, debit card, or banking information as well. The fund guardian or other payment source information may be transferred before or after rate negotiation. The preference would be after rate negotiation, just before any payment is necessary.

At 210, account information (AI) for the customer associated with the identifier is retrieved. The account information may comprise the identity of and communication address for the customer's banking institution, broker, electronic wallet, or other fund guardian. The account information may comprise a network address of the fund guardian. For example, on Internet Protocol (IP) networks, the fund guardian address may comprise an IP address and a port number. The fund guardian address may also be a symbolic name, e.g., fund.guardian@holdmymoney.com, which can then be looked up at a Domain Name Server or LDAP directory. The account information may also comprise an account number, a debit or credit card number, fund routing information, and any other information necessary and/or useful to effecting fund allocations and transfers on or from the customer's account. This information may also reside in the fund guardian, and it doesn't have to be transferred over the air. In a general sense, an account authorization and/or debit may occur on a transaction basis, and may occur prior to, subsequent to, or concurrently with, the provided service.

Fraud and theft are made more difficult because the customer's account information is not communicated over less secure communication channels (such as wireless channels). The communication channel between the telecom system and the data repository may be highly secure.

At 214 the telecom system may communicate to the phone, the rate to be charged for use of the telecom system. In one embodiment, the phone may provide the destination address of a call (e.g., cell call, data session, IP address, etc.) to the telecom system before the rate (or other call information) is determined. At 218 the phone communicates to the telecom system a user authorization (UAU) to pay the rate or other information. The communication 218 may include an amount (AMT) to prepay for use of the telecom system, and or authentication information (AUTHI). The AMT may also comprise an amount associated with a telecom system use time. The authentication information (AUTHI) is any information that helps establish the customer's identity. Personal identification numbers (PINs), passwords, written signatures, digital signatures, and digital certificates are examples of authentication information. Authentication information may help establish trust that the caller is the person associated with the account information. The authentication information may also comprise biometric information of the caller. For example, the phone may perform a biometric scan, such as a voice scan, fingerprint scan, retinal scan, and so on. The scan reads biometric information about the user of the phone. In one embodiment, the biometric scan is performed by the caller speaking into a microphone of the phone.

At 222 the account information, amount, authentication information, and device and/or customer identifier are communicated from the telecom system to the fund guardian. The fund guardian employs the identifier to retrieve a corresponding authentication print (AUTHP) from the data repository. The authentication print is any stored information that represents the customer or other party associated with the identifier. Personal identification numbers (PINs), passwords, and written signatures are examples of authentication prints. The authentication print may also comprise biometric information. For example, the biometric information may comprise a voice print, fingerprint, retina print, and so on.

At 234 the fund guardian 1) compares the authentication information with the authentication print to authenticate the customer, and 2) verifies that sufficient customer funds are available to satisfy the amount. In other embodiments, the fund guardian does not perform the authentication. Instead, the authentication of the customer may be performed by the telecom system or other authentication device or service.

At 238 the fund guardian communicates an authorization (AU) to the telecom system, indicating that sufficient funds are available to satisfy the amount. The fund guardian also allocates (reserves) the funds. In one embodiment, the authorization may comprise customer authorization credentials to establish trust that the payment authorization is from the customer and has not been altered during communication from the client to the funds guardian or billing system. A digital signature may also help establish non-repudiation of the origin of the payment authorization.

An authorization code may be included to uniquely identify the fund authorization from other such authorizations. The authorization code may be used to associate the fund authorization with the later communication of the charge from the telecom system to the fund guardian.

The telecom system authorizes use by the phone at 242. At 246 the phone communicates to the telecom system a destination address with which to communicate. The destination address could be a phone number, an IP address, or other communication address.

At 250 the call is completed to the destination address. The telecom system then begins, at 254, to track the time that the telecom system is in use by the phone. At 258 the prepaid amount of time expires. A voice over may be provided to the phone subscriber indicating that the authorized period is terminating (FIG. 3 discusses additional time authorization). At 262 the telecom system submits a charge for the amount to the fund guardian. At 266 the fund guardian debits the funds from the customer's account, or debits a customer's credit/debit card, and the funds are transferred at 270 to the telecom system or a fund guardian of the telecom system.

In other embodiments, signals or communications from the phone to the telecom system, and from the telecom system to the phone (e.g., 202, 214, 218, 242, 246, 258) are combined, or occur in another order. For example, the identifier 202 can be sent with the destination address 246. This would be helpful, for example, in determining a rate 214 based on a given network topology or distance from the device to the destination address. Further, an authorization 218 could be combined with a destination address 246. Additionally, for a device such as a computer, the computer may communicate a bandwidth request along with the identifier 202, and the rate 214 may include varied rates based on varied bandwidths available to the computer. In such an embodiment, the authorization 218 would include a bandwidth authorization if multiple bandwidths were available through the telecom system.

With reference to FIG. 3, in another embodiment the account information (AI) is stored by the phone or other device. For devices such as mobile phones, the account information may be stored in a Subscriber Identity Module (SIM) coupled with the phone. The phone or other device may at 302 communicate an identifier, account information, fund guardian, and authentication information to the telecom system, and to the data repository at 306 (although, all of this is not needed, i.e., account information). Where communication is over a less secure channel, the risk of fraud and/or theft of the account information may be reduced by encrypting the account information. The identifier is applied at 310 to retrieve from the data repository an amount AMT (either an amount of time, or a dollar amount) to prepay. A highest acceptable rate (HAR) that the customer is willing to pay to use the telecom system is also retrieved. In another embodiment, the AMT and HAR are stored by the device (for example, in a mobile phone SIM, or other device memory) and communicated by the device to the telecom system.

At 322 the account information, amount, and authentication information are communicated from the telecom system to the fund guardian. In other words, prepayment of the AMT is automatically authorized by the telecom system, without separate authorization by the customer, provided that the rate does not exceed the HAR. The fund guardian employs the account information to retrieve a corresponding authentication print (AUTHP) stored by the fund guardian. At 334 the fund guardian 1) compares the authentication information with the authentication print to authenticate the customer, and 2) confirms that sufficient customer funds are available to satisfy the amount.

At 338 the fund guardian communicates a fund authorization (FAU) to the telecom system, indicating that sufficient funds are available to satisfy the amount. The fund guardian also allocates (reserves) the funds. The telecom system authorizes use by the phone at 342. At 346 the phone communicates to the telecom system a destination address with which to communicate. The destination address could be a phone number, an IP address, or other communication address.

At 350 the call is completed to the destination address. The telecom system then begins, at 354, to track the time that the telecom system is in use by the phone. At 358 the telecom system notifies the phone that the prepaid amount will expire soon. At 369 the customer authorizes an additional amount of time or money, e.g. the customer authorizes an additional AMT. Unlike the initial authorization to prepay AMT (which in one embodiment does not require explicit authorization so long as the rate does not exceed HAR), in this embodiment the authorization of additional time involves explicit authorization by the customer.

At 360 the telecom system communicates the account information and the AMT to the fund guardian. Additionally, the phone may communicate a transaction identifier (TID) to be used to associate the additional authorization with the ongoing call. The customer may be charged once for the call, instead of being charged in separate transactions for each authorization of AMT. In one embodiment, transaction information includes a transaction ID, the beginning time of the call, the rate, and the customer's name or other identifying indicia. The transaction could be identified uniquely in any number of well-known manners.

At 361, the fund guardian confirms and allocates funds to cover the AMT, and the fund guardian communicates an authorization to the telecom system. The telecom system allows the call to continue. If the authorization fails, the call may be terminated, or the fund guardian may authorize an amount less than AMT, to the limit of available funds, in which case the call may continue until the authorized amount is exhausted. If the call is not terminated earlier because funds are exhausted, at 362, the subscriber terminates the call. In either termination case, the telecom system communicates a charge to the fund guardian for the amount of time actually used. The customer is charged for the time they spent using the system. Thus, although use of the telecom system is prepaid, no funds are allocated or otherwise placed out of the customer's control for time not actually used. This may reduce the financial impact of the prepaid system on the customer's finances, without sacrificing the advantages associated with prepayment (e.g. guaranteed payment).

At 366 the fund guardian debits the funds from the customer's account (or obtains the funds from customer credit/debit card service), and the funds are transferred at 370 to the telecom system or a fund guardian of the telecom system.

Figure 4:
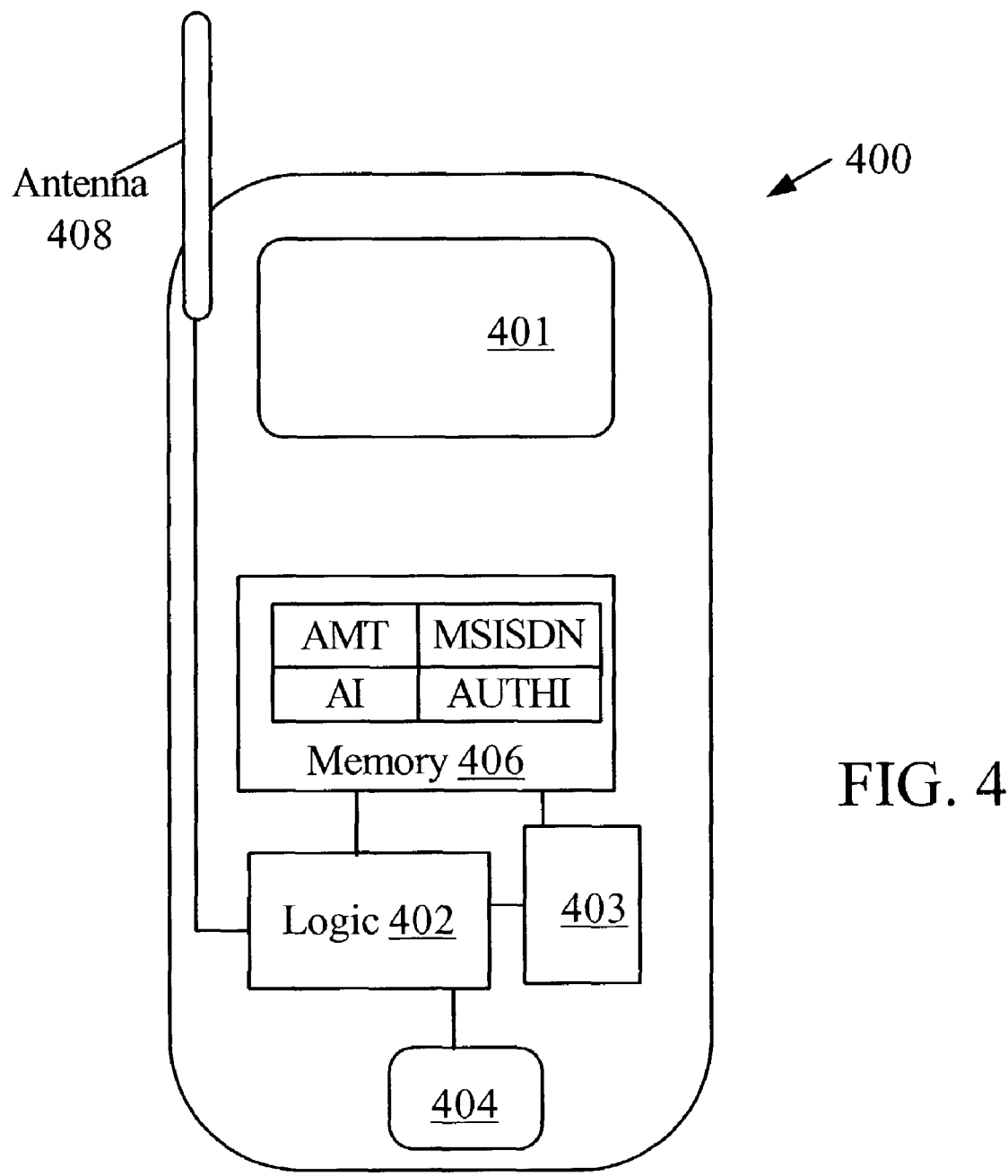
FIG. 4 illustrates an embodiment of a mobile telephone.

With reference to FIG. 4, a wireless device embodiment 400 includes an antenna 408 for communicating and receiving wireless signals. The device 400 further comprises a display 401, a processor 403, logic 402, and a memory 406. The logic 402 may comprise instructions and data that the processor 403 executes and operates upon, respectively.

The memory 406 may store data representing the amount AMT of time or money to authorize, the device or customer identifier (e.g. MSISDN), a highest acceptable rate (HAR), the customer's account information (AI), and authentication information (AUTHI) scanned from an input device, such as a microphone 404. The logic 402 may comprise instructions to provide the identifier, amount, account information, and authorization information to the telecom system. The logic 402 may comprise instructions to automatically authorize prepayment of the AMT when the rate provided by the telecom system does not exceed the HAR. The memory 406 may comprise random access memory (RAM), read-only memory (ROM), flash memory, and other storage technologies. In one embodiment, the memory 406 may comprise the logic 402. In an embodiment that includes a SIM card, portions of the logic or the stored data may be kept in device memory or in SIM memory.

The processor 403 is typically coupled via a transceiver to the antenna 408, and together they may operate to communicate the customer identifier, the customer's account information, and the authentication information to the telecom system.

Typical transaction records for methods as described above are illustrated in FIGS. 5-7. FIG. 5 is a schematic diagram illustrating a representative transaction information record 500. Typically, the record includes fields associated with a transaction item, transaction cost, and transaction date. A transaction identifier and vendor fields are provided for authentication credentials, fund confirmation address, and payment address. In other representative transaction information records, fewer or more fields can be provided. FIG. 6 illustrates a representative payment authorization record 600 that includes a transaction identifier, client authentication credentials, an authorization code field, and vendor specific fields for a fund confirmation address and a payment address. A payment confirmation 700 is illustrated in FIG. 7. The payment confirmation typically includes fund guardian authentication credentials, a transaction identifier, and an authorization code.

Particular embodiments of a method and apparatus have been described herein. Many alternative embodiments will now become apparent to those skilled in the art. It should be recognized that the described embodiments are illustrative only and should not be taken as limiting in scope. Rather, the present invention encompasses all such embodiments as may come within the scope of the following claims and equivalents thereto.

What is claimed:

1. A method of user payment in a telecommunication system, comprising:
   receiving from a device, a message specifying one of a plurality of data repositories, wherein the specified data repository is separate from any home location register in the telecommunication system;
   receiving from the device, a request to establish a call or data session with the device on the telecommunication system, the request comprising a device identifier;
   obtaining account information associated with the device from the specified data repository using the device identifier to identify the associated account information, wherein the specified data repository is remote from the device such that the account information is not transmitted by the device;
   sending to a fund guardian the device identifier, the account information and a payment amount needed to use the device;
   receiving from the fund guardian, an authorization indicating the payment amount is available;
   based on the authorization from the fund guardian, allowing use of the device on the telecommunication system; and
   storing a highest-acceptable rate in the data repository, wherein the highest-acceptable rate indicates a highest rate that a customer associated with the device is willing to pay for use of the telecommunication system by the device without a requirement for explicit authorization.

2. The method of claim 1, further including tracking an amount of time the device uses the telecommunication system and terminating the use if the authorized payment amount is expended.

3. The method of claim 2, further including sending an alert to the device that the authorized payment amount is nearly expended, and receiving a second authorization from the fund guardian to continue use of the device.

4. The method of claim 1, wherein the device is a wireless mobile telephone.

5. The method of claim 1, further including transferring funds from the fund guardian to the telecommunication system based on and after the use of the telecommunication system by device.

6. The method of claim 1, wherein the associated account information comprises information identifying the fund guardian.

7. The method of claim 1, wherein the request comprises information identifying the fund guardian.

8. The method of claim 1, further comprising obtaining the payment amount from the data repository.

9. A method of user payment in a telecommunication system, comprising:
   receiving in a transmission from a device, information specifying one of a plurality of data repositories, wherein the specified data repository is separate from any home location register in the telecommunication system;
   receiving from the device, a request to establish a call or data session with the device on the telecommunication system, the request comprising a device identifier;
   receiving in a transmission from the device a payment amount needed to use the device and a highest acceptable rate;
   obtaining account information associated with the device from the specified data repository using the device identifier to identify the associated account information, wherein the specified data repository is remote from the device such that the account information is not transmitted by the device;
   sending to a fund guardian the device identifier, the account information and the payment amount; and
   receiving from the fund guardian, an authorization indicating the payment amount is available.

10. The method of claim 9, wherein the device is a wireless mobile telephone.

11. The method of claim 9, further comprising:
   receiving authentication information from the device;

sending the authentication information to the fund guardian.

12. The method of claim 9, further comprising receiving fund guardian identifying information that identifies the fund guardian out of a plurality of fund guardians.

13. The method of claim 12, wherein the fund guardian identifying information is received from the specified data repository.

14. The method of claim 12, wherein the fund guardian identifying information is received from the device.

15. The method of claim 12, wherein the fund guardian identifying information is a network address.

16. The method of claim 9, wherein the data repository specifying information is a network address.

17. The method of claim 9, wherein the fund guardian is not part of the telecommunication system.

18. The method of claim 9, wherein the specified data repository is not part of the telecommunication system.

* * * * *